(12) United States Patent
Higashimura et al.

(10) Patent No.: US 7,099,564 B2
(45) Date of Patent: Aug. 29, 2006

(54) IMAGE RECORDING AND SELECTIVE REPRODUCING APPARATUS

(75) Inventors: Mamoru Higashimura, Yokohama (JP); Kazuhisa Tsuzuki, Fort Lee, NJ (US); Motohiro Misawa, Yokohama (JP); Megumi Umezawa, Kawasaki (JP); Ichiro Ogawa, Yokohama (JP); Manabu Nakamura, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 601 days.

(21) Appl. No.: 09/915,850

(22) Filed: Jul. 26, 2001

(65) Prior Publication Data

US 2002/0012527 A1 Jan. 31, 2002

(30) Foreign Application Priority Data

Jul. 31, 2000 (JP) ............................. 2000-231523

(51) Int. Cl.
*H04N 5/91* (2006.01)
(52) U.S. Cl. ................. 386/95; 386/35; 386/5
(58) Field of Classification Search .............. 386/1, 386/47, 52, 68, 110, 86, 5, 35, 95; 348/159, 348/143, 169, 262, 578, 588
See application file for complete search history.

(56) References Cited

U.S. PATENT DOCUMENTS 5,625,504 A 4/1997 Okada et al.

FOREIGN PATENT DOCUMENTS

| EP | 0 676 898 A1 | 10/1995 |
|---|---|---|
| GB | 2 330 977 A | 5/1999 |
| JP | 04-016085 | 1/1992 |
| JP | 08-018922 | 1/1996 |
| JP | 63-276776 | 11/1998 |
| JP | 11-341431 | 12/1999 |

OTHER PUBLICATIONS

Navco Model 1700 System Controller Operating Instructions, Jun. 1997CAM Chapter and SRT Chapter.*
NAVCO Model 1700 System Controller Operating Instructions, Jun. 1997, with MENU, CAM, HLD, MON, DIS, CLK, PAS, VCR, and SRT chapters and Appendices A, B, C, and D.*

* cited by examiner

*Primary Examiner*—James J. Groody
*Assistant Examiner*—James A. Fletcher
(74) *Attorney, Agent, or Firm*—Pearne & Gordon LLP

(57) ABSTRACT

An image recording and reproducing apparatus for recording and reproducing a multiple picture signal obtained by multiplexing picture signals from a plurality of cameras via a frame switcher, the image recording and reproducing apparatus performing high-accuracy fast-forwarding of a prerecorded image from a specific camera and allowing easy retrieval of a target image. The image recording and reproducing apparatus has a skip reproduction feature for alternating skipping of n frames and continuous reproduction of m frames. m is set to a number related to the frame switching pattern. In case n=4 and m=3, four frames are skipped after reproduction of Frame A1. Then Frames C6, A7, B8 are continuously reproduced. Thus, the images displayed on the monitor are A1, A7, and A13.

17 Claims, 8 Drawing Sheets

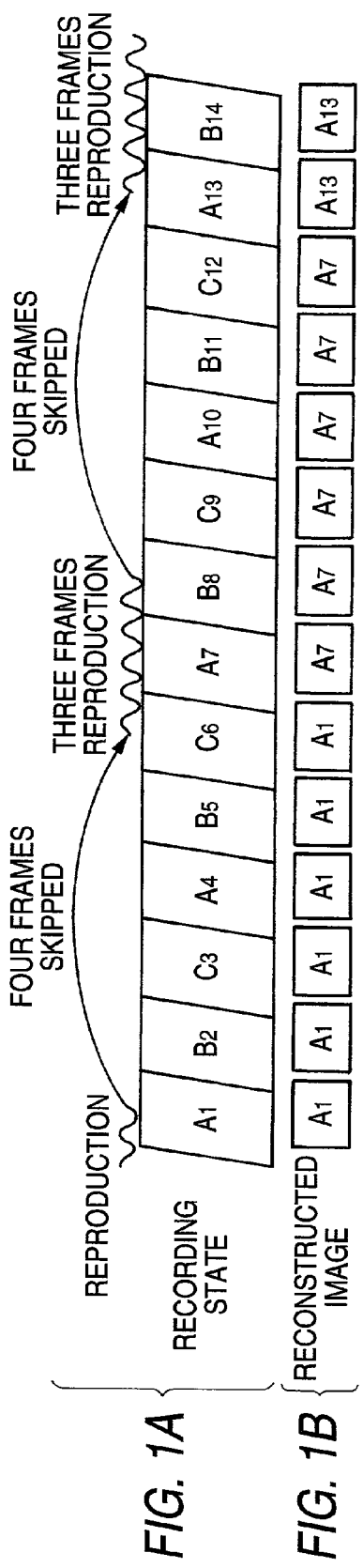

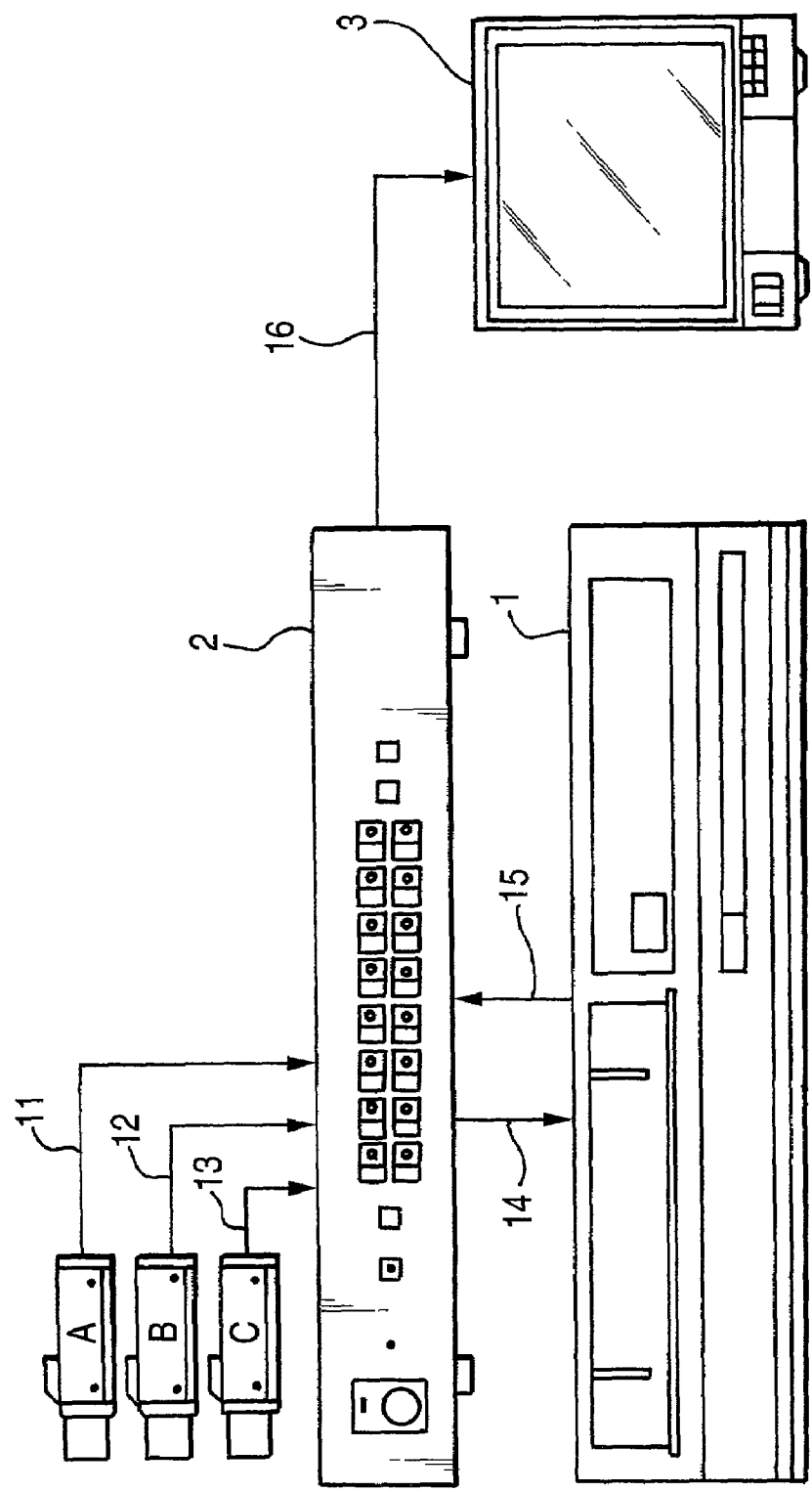

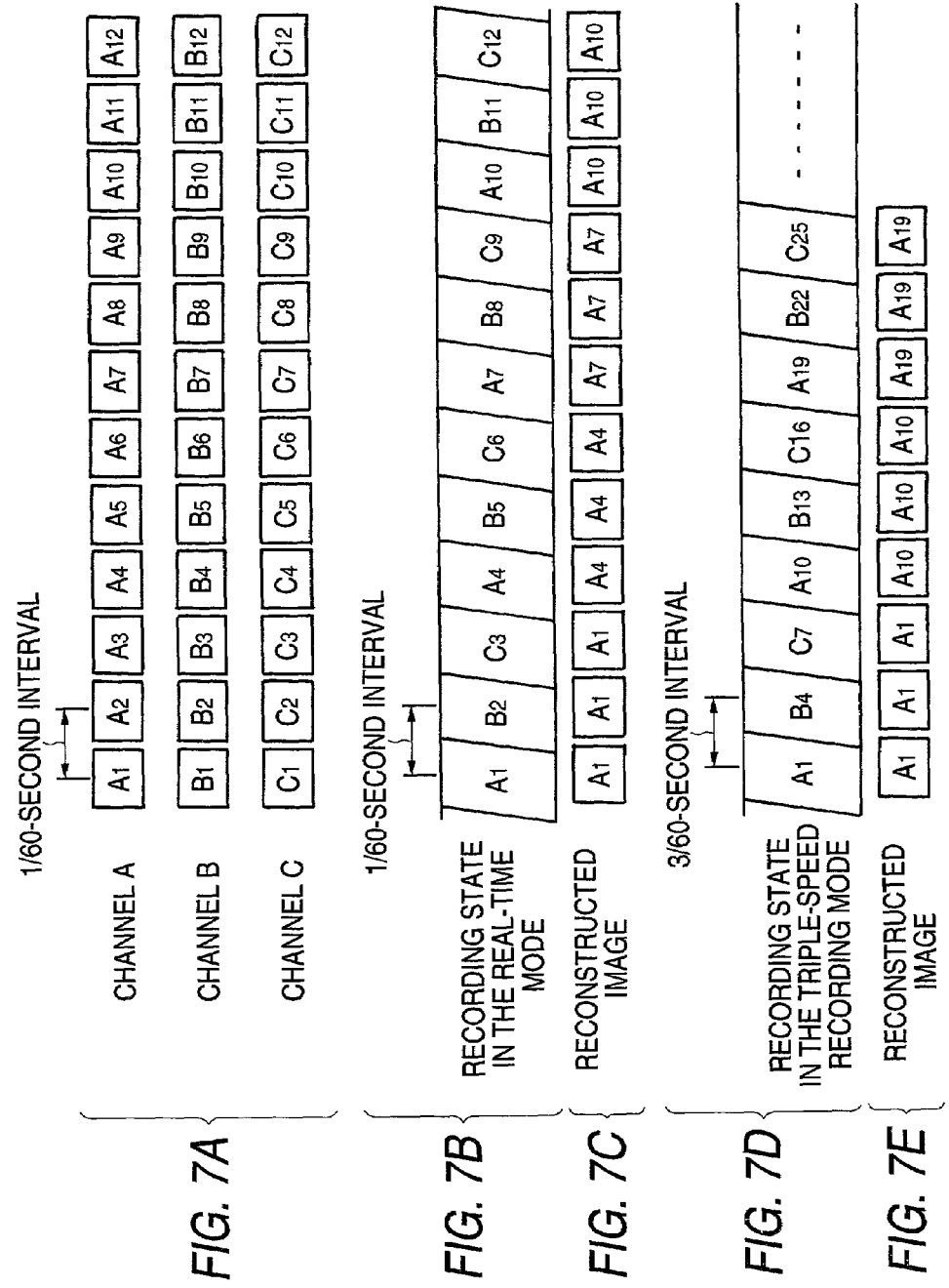

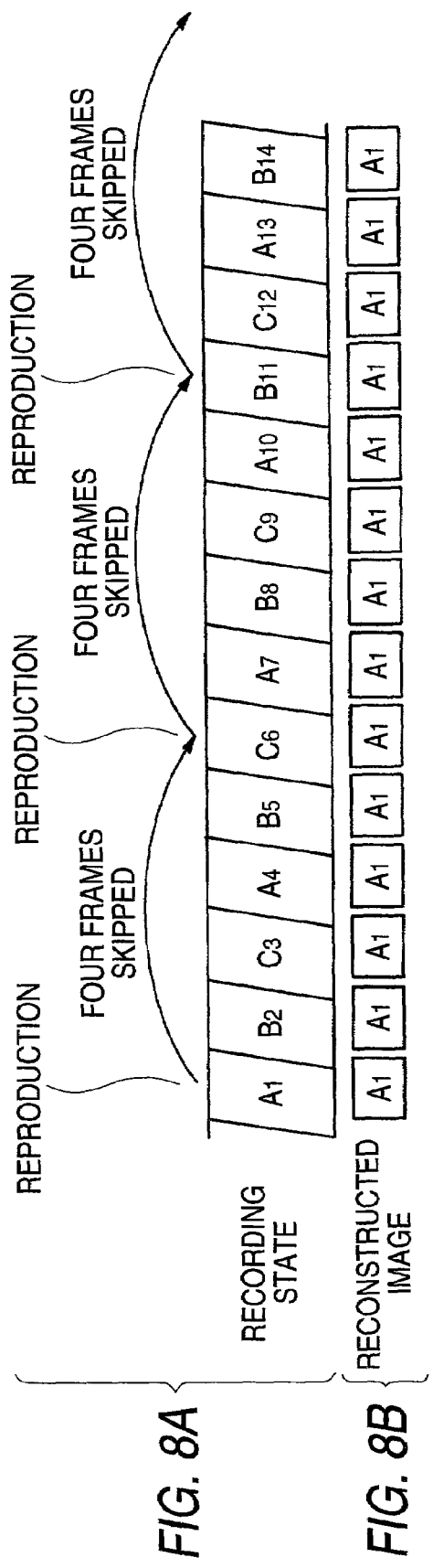

IMAGE RECORDING AND SELECTIVE REPRODUCING APPARATUS

BACKGROUND OF THE INVENTION

The present invention relates to an image recording and reproducing apparatus for recording and reproducing a multiple picture signal obtained by multiplexing picture signals from a plurality of cameras via a frame switcher, and in particular to an image recording and reproducing apparatus that fast-forward reproduces a prerecorded image.

FIG. 6 shows a general configuration of an image recording and reproducing system for multiplexing shot images from a plurality of cameras A, B, C via a frame switcher 2 and recording and reproducing the multiple image. Picture signals 11, 12, 13 on Channel A, Channel B, and Channel C shot via a plurality of cameras A, B, C are switched on a time-division basis per frame by the frame switcher 2, and transmitted to an image recording and reproducing apparatus 1 as a multiplex signal 14, then recorded on a recording medium (not shown) such as a magnetic tape. A reproducing signal 15 of the image recorded on a recording medium is transmitted to the frame switcher 2. Frames on a channel selected by the frame switcher 2 are transmitted to a monitor 3 as a display signal 16, and displayed on the monitor 3.

FIGS. 7A to 7E shows an example of a picture signal at each section of the image recording and reproducing system in FIG. 6. FIG. 7A shows picture signals on Channel A, Channel B, and Channel C shot by Cameras A, B, and C. A new frame image is input to the frame switcher 2 every 1/60 second. FIG. 7B is the recording state of a recording medium in the real-time mode. Time-division switching is made by the frame switcher 2 and frames on Channel A, Channel B and Channel C are recorded every 1/60 second. While FIG. 7B shows switching in equal intervals, recording frequency maybe individually set per camera depending on the location of each camera. FIG. 7C is an example of a reconstructed image displayed on a monitor while the frame switcher 2 selects channel A. In reproducing, reconstructed images are input to the frame switcher in the order of A1, B2, C3, A4, B5, C6 and so on, as shown in FIG. 7B, only the image on Channel A is displayed since the frame switcher selects Channel A.

FIG. 7D is the recording state of a recording medium in the triple-speed recording mode. FIG. 7E is an example of a reconstructed image displayed on the monitor. In this case, each frame is recorded every 3/60 second so that recording is made on the recording medium in the order of A1, B4, C7, A10, B13, C17 and so on. Images to be reconstructed and displayed are in the order of A1, A10, A19 and so on in the case the frame switcher selects Channel A.

In such an image recording and reproducing system, number of frames to be skipped was set previously and frame images were read in a curtailed fashion and transmitted to the frame switcher in order to display images on a selected channel on the monitor. This sequence is shown in FIGS. 8A. Assuming that the number of frames to be skipped is 4, picture signals reconstructed in the order of A1, C6, B11 and so on are transmitted to the frame switcher 2, as shown in FIG. 8A. As in FIG. 7, assuming that the frame switcher selects Channel A, the monitor displays the image A1 continuously as shown in FIG. 8B. This renders the displayed image changeless, thus preventing recognition of a fast-forwarding.

SUMMARY OF THE INVENTION

The invention aims at high-accuracy fast-forwarding of an image from a specific camera to retrieve a target image with ease, in image recording and reproducing apparatus for recording and reproducing a multiple picture signal obtained by multiplexing picture signals from a plurality of cameras via a frame switcher.

According to the present invention, an image recording and reproducing apparatus for recording and reproducing a multiple picture signal obtained by multiplexing picture signals from a plurality of cameras via a frame switcher, has a skip reproducing function for alternating skipping of n frames and continuous reproducing of m frames (n being a positive integer, and m being a positive integer related to a frame switching pattern). Thus, it is possible to make setting in order to ensure that the frames on the channel to be displayed are present in the continuous frames to be reproduced after skipping of predetermined number of frames. This enables high-accuracy fast-forwarding reproduction.

The image recording and reproducing apparatus has a feature for reproducing at least m frames continuously at the beginning and end of a reproduction image. Thus it is possible to display a start image and a final image on a channel to be displayed also in fast-forwarding reproduction.

BRIEF DESCRIPTION OF THE DRAWINGS

FIGS. 1A and 1B outline a reproduction feature of an image recording and reproducing apparatus according to the invention;

FIG. 6 shows a general configuration of an image recording and reproducing system;

FIGS. 7A to 7E show an example of a picture signal at each section of the image recording and reproducing system in FIG. 6; and FIGS. 8A and 8B illustrate a prior art fast-forwarding feature.

DETAILED DESCRIPTION OF THE PREFERRED EMBODIMENTS

Embodiments of the invention will be described referring to FIGS. 1 through 5.

FIG. 1 outlines the reproducing feature of an image recording and reproducing apparatus according to the invention. FIG. 1A shows the state of the recording frames on a recording medium in the real-time mode, same as FIG. 7B. An image recording and reproducing apparatus according to the invention has a skip reproducing feature for alternating skipping of n frames and continuous reproducing of m frames (n being a positive integer, and m being a positive integer related to a frame switching pattern). While n=4 and m=3 in the figure, these values may be selected as required depending on the number of cameras and the recording pattern. Especially, m should be a value so that images on all the channels are included in m continuous frames. In case continuous frame images on a specific channel are recorded on the recording medium, skip reproducing is allowed by setting m=1. It is possible to change the number of frames n to be skipped during fast-forwarding. The number of frames n may be changed in succession and may be changed to an arbitrary number of frames. Especially, in case the number of frames is decreased, setting that the number of frames (n−d) may be specified (2≦d<n, d is a positive integer) allows quicker retrieval of an image.

Via such a setting, as shown in FIG. 1A, four frames are skipped after reproducing Frame A1, followed by continuous reproducing Frames C6, A7, B8. Thus, the images displayed on the monitor will be A1, A7, A13, allowing switching of displayed images, unlike in FIGS. 8A and 8B.

Skipping of n frames and continuous reproducing of m frames are implemented by performing skipping for recognizing frames alone without reading the contents of the picture signals recorded on a recording medium, and reproduction processing for reading and outputting the contents of frames, via a controller (not shown) in the image recording and reproducing apparatus.

Figure 2A:
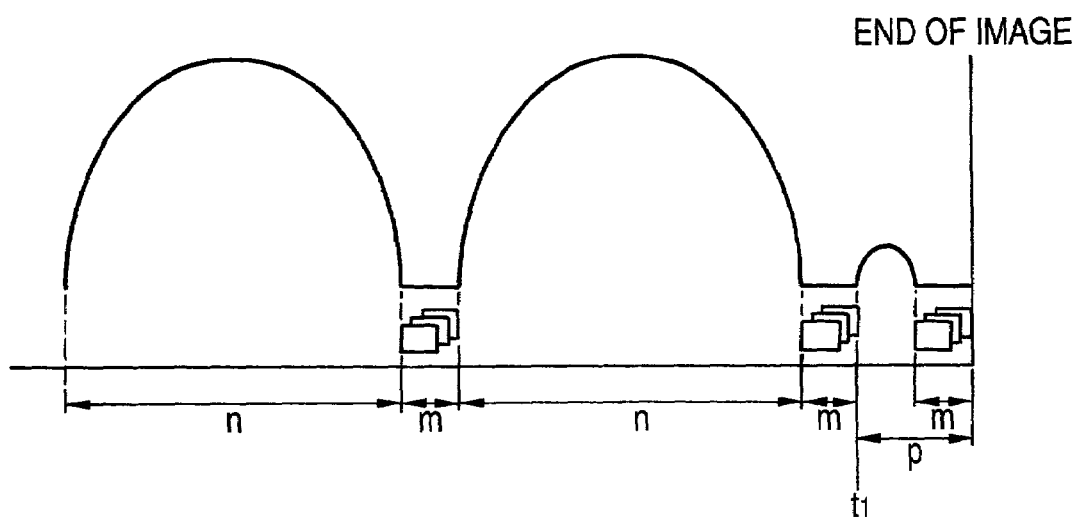
FIGS. 2A and 2B show first embodiment of the invention.
Figure 2B:
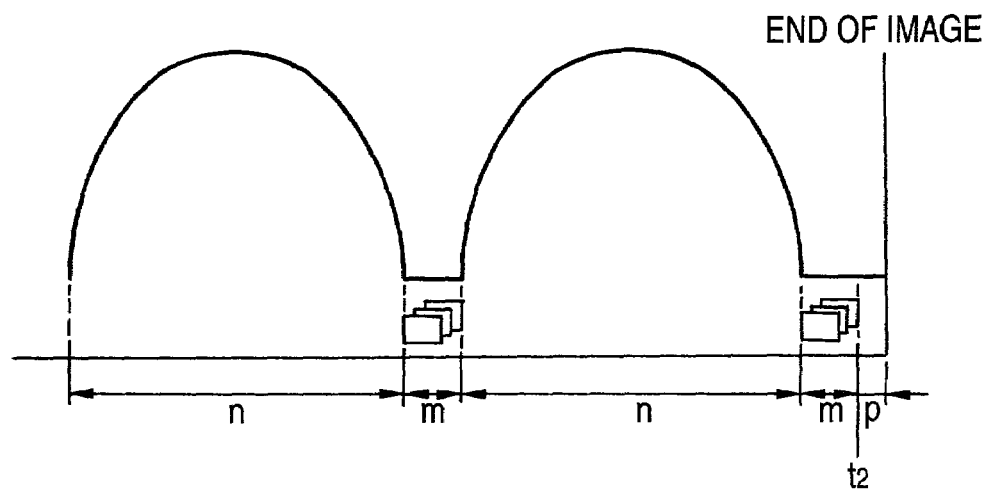
Figure 3A:
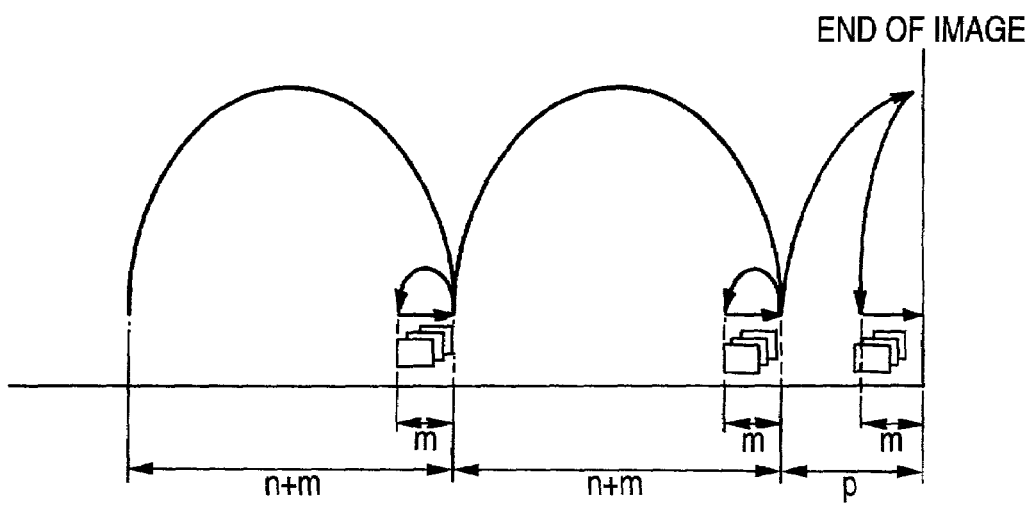
FIGS. 3A and 3B show second embodiment of the invention.
Figure 3B:
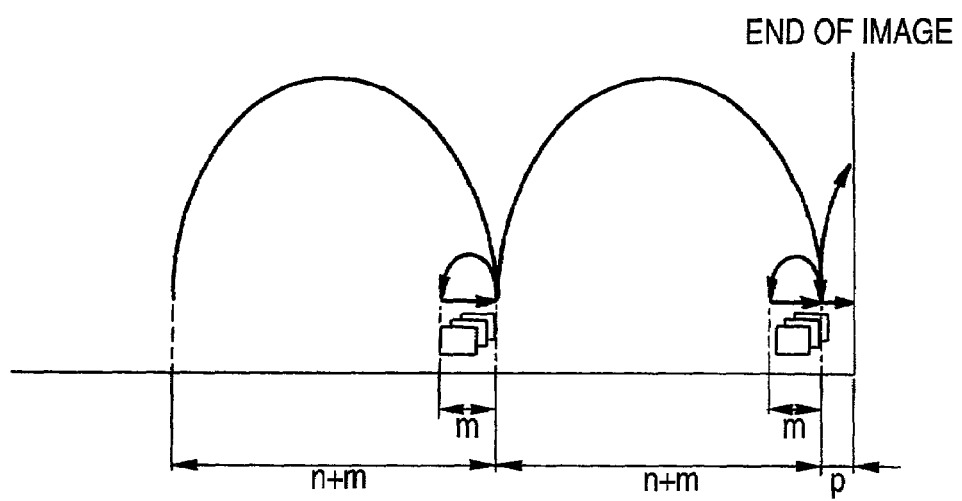

FIGS. 2A and 2B show the first example of the implementation method. FIGS. 3A and 3B show the second example of the implementation method. In the example of FIGS. 2A and 2B, skipping of n frames and continuous reproducing of m frames are alternated. In the example of FIGS. 3A and 3B, skipping of (n+m) frames is followed by reversed skipping of m frames then reproduce of m frames.

Image recording and reproducing apparatus according to the invention is capable of displaying the starting frame and the final frame of a channel to be displayed in fast-forwarding of a recorded image. To ensure that the starting frame is displayed, reproducing of m frames is performed after fast-forwarding is started. Then, as mentioned earlier, skipping of n frames or (n+m) frames is performed. End processing to ensure that the final frame is displayed differs between the first example in FIGS. 2A and 2B and the second example in FIGS. 3A and 3B.

In order to perform end processing in the first example shown in FIGS. 2A and 2B, it is necessary to recognize the number of remaining frames assumed once reproduction is made. Recognition of the remaining frames is implemented by arranging that the total number of recording frames, number of skipped frames and number of reproduced frames are recognized. Recognition of the total number of recording frames is implemented via such a method as recording the corresponding data in a specific area on the recording medium. Recognition of the number of skipped frames and the number of reproduced frames is easily implemented by using a counter. To append an inherent number to each frame, count processing halfway is unnecessary.

The end processing is made in case the number of remaining frames is equal to or less than (n+m) when reproduction is made. In FIG. 2A, the number of remaining frames p satisfies m≦p ≦(n+m) at time point t1. In this case, skipping is made on (p−m) frames and reproduction is made on the remaining m frames. In FIG. 2B, the number of remaining frames p satisfies p<m at time point t2. In this case, reproduction is made on all the remaining frames.

In the second example shown in FIGS. 3A and 3B, it is not necessary to recognize the number of the remaining frames. End processing is started when the end of image is detected during skipping. In FIG. 3A, the number of skip frames p assumed when the end of image is detected satisfies m≦p. In this case, detection of the end of image is followed by reversed skipping of m frames, then reproduce of m frames. In FIG. 3B, the number of skip frames p assumed when the end of image is detected satisfies p<m. In this case, reversed skipping of p frames is made then reproduction of p frames.

Thus, in the example in FIGS. 3A and 3B, in case the end of image is reached during skipping, reproduction of a maximum of m frames is performed within the number of skipped frames in the immediately preceding processing.

Thus, at least m frames are reproduced at the end of a recorded image in both examples in FIGS. 2A and 2B and FIGS. 3A and 3B. As a result, it is possible to ensure that the final frame on a target channel is displayed.

While it is ensured that the final frame of a target channel is displayed by performing an end-of-image processing, it is possible to make adjustments at the start of fast-forwarding.

Figure 4A:
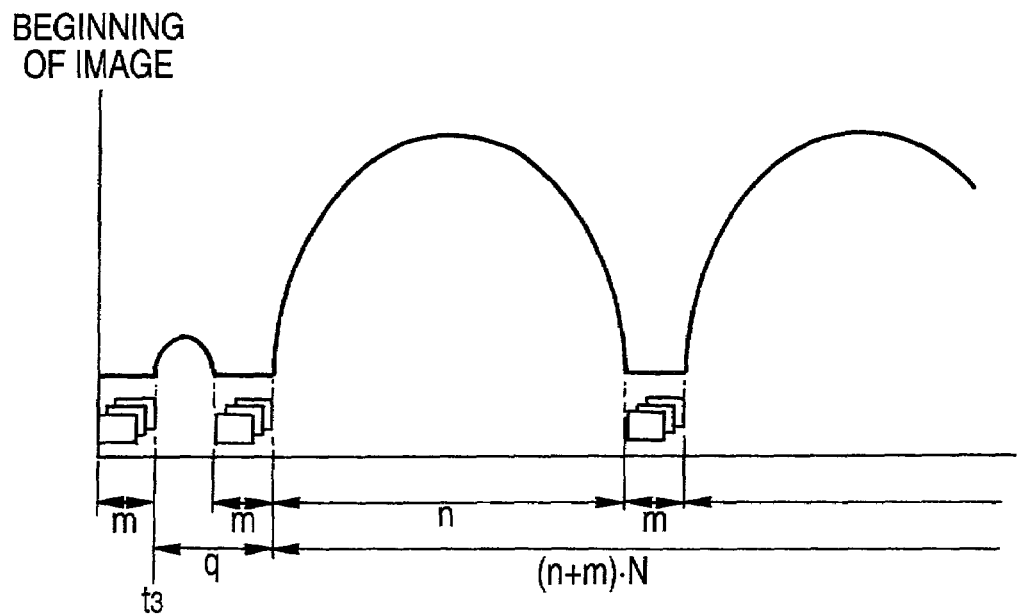
FIGS. 4A and 4B illustrate an adjustment processing at start of skip reproduction in the first embodiment.
Figure 4B:
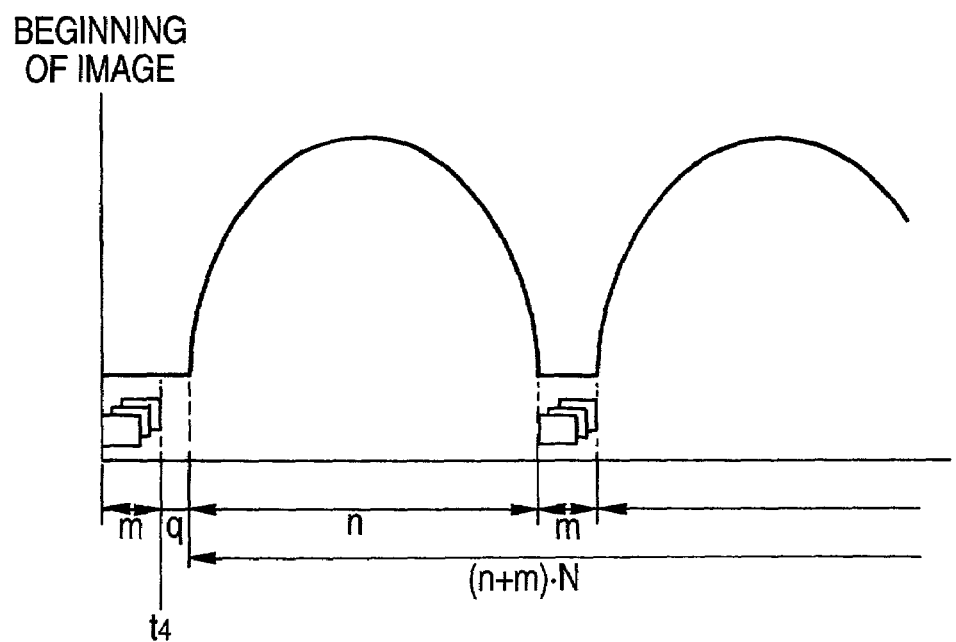

FIGS. 4A and 4B show an adjustment processing at start of reproduction as applied to the first example in FIGS. 2A and 2B. This example performs reproduction of m frames at the start of reproduction. At time point t3 after reproduction of m frames, the remainder q of division of the number of remaining frames by (n+m) is obtained. In FIGS. 4A and 4B, the quotient is represented as N. As shown in FIG. 4A, in case m≦q, skipping is made on (q−m) frames, followed by reproduction of m frames. Then, skipping of n frames and continuous reproduction of m frames are alternated. In FIG. 4B, the remainder q obtained at time point t4 satisfies q<m. In this case, reproduction of q frames is performed, then skipping of n frames and continuous reproduction of m frames are alternated as in FIG. 4A.

Figure 5A:
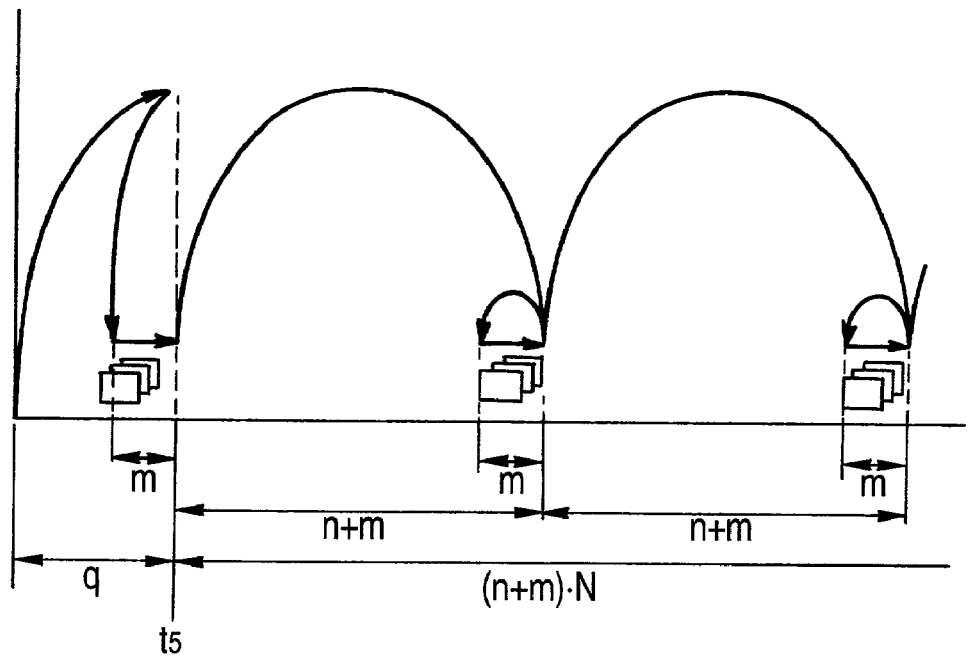
FIGS. 5A and 5B illustrate an adjustment processing at start of skip reproduction in the second embodiment.
Figure 5B:
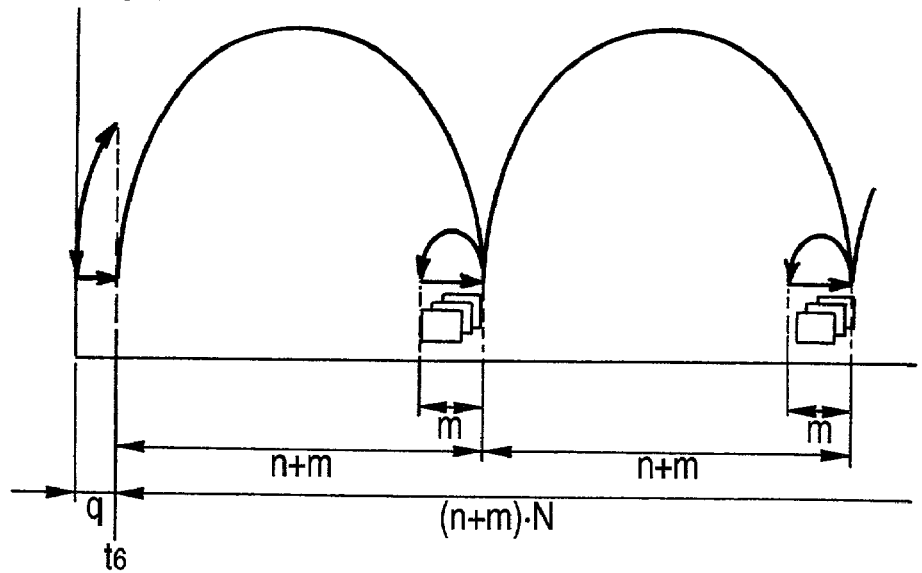

FIGS. 5A and 5B show an adjustment processing at start of reproduction as applied to the second example in FIGS. 3A and 3B. It is necessary to recognize the number of remaining frames. Recognition of remaining frames is easily implemented by acquiring the total number of frames at start of reproduction and decrementing (counting down) the value by the number of reproduced frames or skipped frames. The adjustment processing detects whether the remaining number of frames is a multiple of (n+m) in the first skipping. FIGS. 5A and 5B show that the number of remaining frames is (n+m)·N (N being a positive integer) at time points t5, t6 where skipping of q frames are performed. In case m≦q at time point t5 as in FIG. 5A, reversed skipping of m frames is performed, followed by reproducing of m frames. After that, skipping of (n+m) frames, reversed skipping of m frames, and reproduction of m frames are repeated in this order. In case q<m at time point t6 as in FIG. 5B, reversed skipping of q frames is performed, followed by reproduction of q frames.

Via such an adjustment processing, end of image is reached after reproduction of m frames in both the example in FIGS. 4A and 4B and the example in FIGS. 5A and 5B. This ensures that the final frame of the target channel is displayed.

In case the number of frames n to be skipped is changed during retrieval of a target image via fast-forwarding, the number of frames to be skipped is changed starting with skipping of the first n frames or (n+m) frames after the change. In case the adjustment processing as shown in FIG. 4 and FIG. 5, adjustment processing is made again at the start of skipping after the change.

Image recording and reproducing apparatus according to the invention may further comprise a feature for suspending reproduction in the middle of skip reproduction. In this case, reproduction is suspended after m frames are reproduced. Such a processing brings the reproduced frame at a time point closest to the suspension time point on the monitor 3 in the event of suspension of reproduction. This is effective for retrieving a target image.

As understood from the foregoing description, according to the invention, it is possible to provide image recording and reproducing apparatus for recording and reproducing a multiple picture signal obtained by multiplexing picture signals from a plurality of cameras via a frame switcher, the image recording and reproducing apparatus performing high-accuracy fast-forwarding of a prerecorded image from a specific camera and allowing easy retrieval of a target image.

What is claimed is:

1. An image recording and reproducing apparatus for recording and reproducing a multiple picture signal obtained by multiplexing picture signals from a plurality of cameras via a frame switcher such that said multiple picture signal is comprised of a series of frames alternating between said plurality of cameras, said image recording and reproducing apparatus having a skip-reproduction feature for alternating skipping of n frames of said multiple picture signal and continuous reproduction of m frames of said multiple picture signal wherein n is a positive integer, and m is a positive integer related to a frame switching pattern, wherein said apparatus skips said frames without reading the contents of the multiple picture signal.

2. The image recording and reproducing apparatus according to claim 1, wherein said number of frames to be skipped is changed during skip reproduction.

3. The image recording and reproducing apparatus according to claim 2, wherein said number of frames are changed to (n−d) (2≦n≦, d is a positive integer) in case said number of frames is decreased.

4. The image recording and reproducing apparatus according to claim 1, wherein at least m frames are continuously reproduced at the end of a reconstructed image.

5. The image recording and reproducing apparatus according to claim 1, wherein at least m frames are continuously reproduced at the beginning of a reproduction image.

6. The image recording and reproducing apparatus according to claim 1, wherein said skip-reproduction feature is implemented by a process including a skip processing step for recognizing said frames and a reproduction processing step for performing reproduction and output of said frames.

7. The image recording and reproducing apparatus according to claim 6, wherein said skip-reproduction feature is implemented by a skipping of n frames and a subsequent reproduction of m frames.

8. The image recording and reproducing apparatus according to claim 6, wherein said skip-reproduction feature is implemented by a forward skipping of a series of (n+m) frames, a reverse skipping of m frames, and a reproduction of m frames.

9. The image recording and reproducing apparatus according to claim 7, wherein said subsequent reproduction is performed on m frames up to a final frame of the reconstructed image when the difference between a frame just before start of said skipping and the final frame of the reconstructed image is equal to or greater than m frames and smaller than or equal to (n+m) frames.

10. The image recording and reproducing apparatus according to claim 7, wherein said reproduction is performed up to a final frame of a reconstructed image when the difference between a frame of the reconstructed image just before start of said skipping and the final frame of the reconstructed image is smaller than m frames.

11. The image recording and reproducing apparatus according to claim 8, wherein reverse skipping of a maximum of m frames is performed within the number of skipped frames in the immediately preceding processing, when a final frame of an image is reached during said skipping.

12. The image recording and reproducing apparatus according to claim 7, wherein adjustment is made to set the remaining number of frames to a multiple of (n+m) at start of said skip reproduction feature and when the number of frames n to be skipped is changed during skip reproduction.

13. The image recording and reproducing apparatus according to claim 8, wherein adjustment is made to set a remaining number of frames to a multiple of (n+m) at start of said skip reproduction feature and when the number of frames n to be skipped is changed during skip reproduction.

14. The image recording and reproducing apparatus according to claim 1, wherein reproduction is suspended after continuous reproduction of said predetermined m frames when suspension of reproduction is instructed during execution of said skip reproduction feature.

15. An image reproducing apparatus for reproducing a multiple picture signal obtained by multiplexing picture signals from a plurality of cameras via a frame switcher such that said multiple picture signal is comprised of a series of frames alternating between said plurality of cameras, said image reproducing apparatus having a skip-reproduction feature for alternating skipping of n frames of said multiple picture signal and continuous reproduction of m frames of said multiple picture signal, wherein n is a positive integer, and m is a positive integer related to a frame switching pattern, wherein said apparatus skips said frames without reading the contents of the multiple picture signal.

16. An image reproducing method for skip reproducing a multiple picture signal obtained by multiplexing picture signals from a plurality of cameras via a frame switcher such that said multiple picture signal is comprised of a series of frames alternating between said plurality of cameras, said image reproducing method comprising the steps of:

skipping n frames of said multiple picture signal;

continuously reproducing m frames of said multiple picture signal, wherein n is a positive integer, and m is a positive integer; and repeating said skipping and continuous reproducing.

17. An image reproducing method for skip reproducing a multiple picture signal obtained by multiplexing picture signals from a plurality of cameras via a frame switcher, said image reproducing method comprising the steps of:

forward skipping n+m frames of said multiple picture signal, then reverse skipping m frames of said multiple picture signal, and then continuous reproducing m frames of said multiple picture signal; and repeating said skipping, reverse skipping and continuous reproducing, wherein n is a positive integer, and m is a positive integer.

* * * * *